United States Patent [19]

Thévenaz

[11] 3,895,766

[45] July 22, 1975

[54] FILM-SPOOL DRIVE IN CINEMATOGRAPHIC EQUIPMENT

[76] Inventor: Jean Thévenaz, Ruelle de Montagny, CH-1422 Grandson, Switzerland

[22] Filed: Sept. 7, 1973

[21] Appl. No.: 395,047

[30] Foreign Application Priority Data
Sept. 8, 1972 Switzerland.................... 13590/72

[52] U.S. Cl. ............... 242/205; 242/189; 242/201; 352/159
[51] Int. Cl. ............................................ G03b 1/54
[58] Field of Search ........... 242/189, 192, 201, 202, 242/204, 205, 209, 210, 67.3, 75.1, 75, 55, 65, 67.1, 75.5, 45, 86.5, 86, 94; 352/159, 166, 181, 182, 183, 184

[56] References Cited
UNITED STATES PATENTS
1,209,755  12/1916  Power................................ 242/189

2,812,144  11/1957  Mitchell............................... 242/45

Primary Examiner—George F. Mautz

[57] ABSTRACT

A film-spool apparatus for cinematographic equipment comprising first and second film-spool support plates, drive means selectively coupled to each of said plates for driving said first plate in a direction to wind the film on its associated spool and to drive the said second plate to unwind the film on its associated spool, and control means operable in response to a predetermined amount of tension in the film loop associated with each of said respective plates for disengaging the drive means from said first plate when its associated film loop tension is above a predetermined amount and for engaging said drive means with said second plate when its associated film loop tension is above a predetermined amount.

3 Claims, 3 Drawing Figures

PATENTED JUL 22 1975

SHEET 1

3,895,766

FILM-SPOOL DRIVE IN CINEMATOGRAPHIC EQUIPMENT

FIELD OF INVENTION

The present invention relates to an intermittent spool driving mechanism for use with the film in cinematographic equipment (cine-cameras or projectors).

BACKGROUND OF INVENTION

In cine-projectors and cameras with intermittent drive, the film is moved forward by a claw at a variable speed. At each movement of the claw it penetrates a perforation in the film and pulls the film forward for the length of one frame. The pull of the claw must overcome the inertia of the spool containing the film and the friction of the edges of the film, as well as the film itself. These forces may be considerable and are often the cause of instability of the image.

Unwinding mechanisms already exist in which the film unwinds at a constant speed, and forms a loop to absorb the tension between the spool and the film-gate. Such prior mechanisms cannot be adapted in all cameras and projectors because they take up much space and increase the cost of the equipment considerably because their manufacture calls for a high degree of precision. Also, these unwinding mechanisms complicate the loading of the apparatus, and, in the case of projectors, prevent a rapid rewinding and their utilization as biformat equipment.

In the case of film cassettes where the spools have parallel axes, the lack of space makes it impossible to have a large loop of the film. It has been suggested that an oscillating bar should be placed between the spool and the gate in order to reduce the jerking of the film. The flexibility of the bar does in fact partially reduce the vibration of the film but the stability of the image remains unsatisfactory in the case where there are joints in the film, which is usually the case in amateur films after editing.

SUMMARY OF INVENTION

The mechanism according to the present invention overcomes all these disadvantages. The cinematographic apparatus according to the present invention comprises an oscillating mechanism to drive the unwinding spool, which reduces the tension produced in the film by the claw, by mechanical means.

Two embodiments of the mechanism which is the object of this invention are shown by way of example in the accompanying diagrams in which.

DETAILED DESCRIPTION

Figure 2:
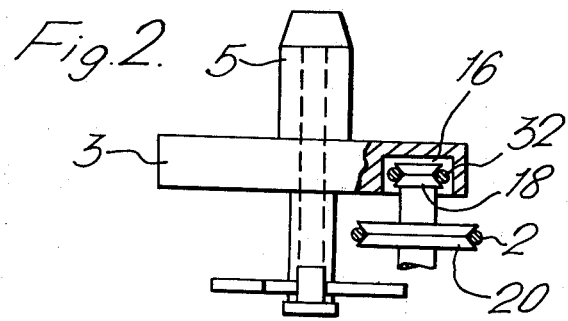
FIG. 2 shows the section I—I of FIG. 1.
Figure 1:
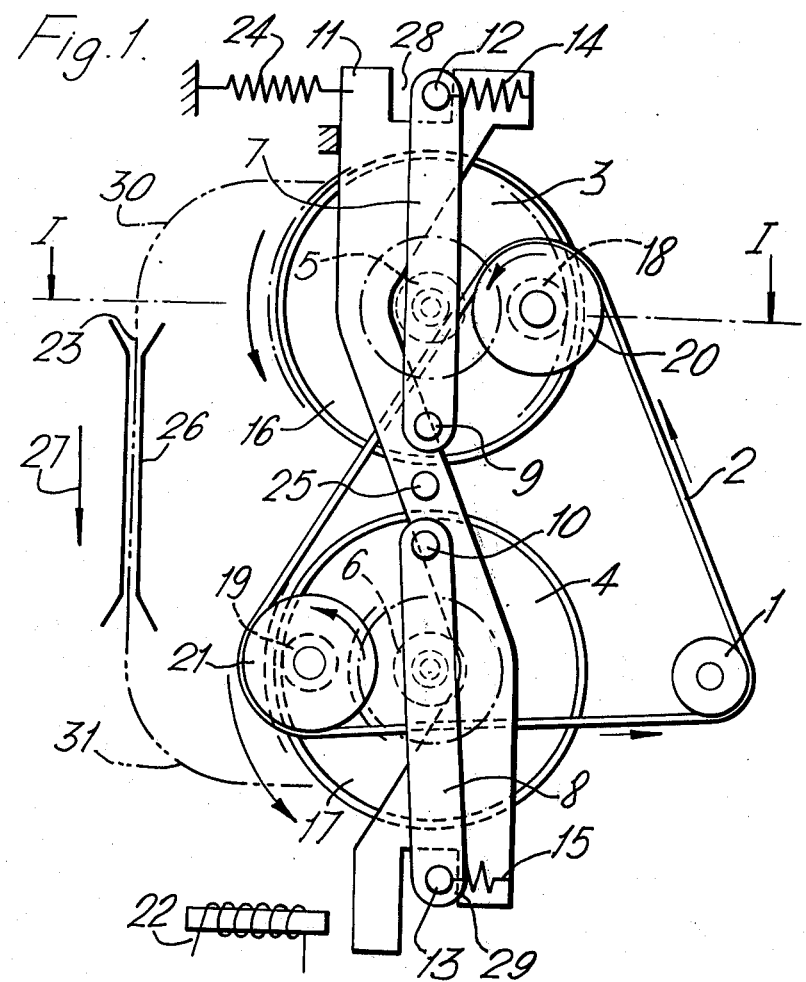
FIG. 1 is a shematic front view of an example of one form of the winding mechanism for film spools according to the invention.

In FIGS. 1 and 2, motor shaft 1 is connected by the belt 2 to the oscillating winding mechanism of the spools which includes two plates, 3 and 4, each having a protruding part 5 and 6 around which the film is wound or unwound respectively. The plates 3 and 4 which can turn on their axes are mounted on two elongated levers 7 and 8 that oscillate around two pivots 9 and 10, which in turn retain one of the extremities of these levers on a bar 11. The extremities of levers 7 and 8 at the opposite end from pivots 9 and 10 bear pins 12 and 13 which rest on the walls of the two notches 28 and 29 defined in each end of bar 11. On each of plates 3 and 4 there is a ring-shaped trough 16 and 17 into which fit pulleys 18 and 19. These pulleys are each fitted with a rubber ring 32 and 33 that comes in contact periodically with either the inner or the outer wall of the troughs 16 and 17. The pulleys 18 and 19 are each integral with wheels 20 and 21, respectively. These wheels are driven at a constant speed by the belt 2 and the motor shaft 1. The bar 11 can pivot about its axis 25 and can take up two distinct positions depending on whether it is being pulled by the spring 24 in the position shown in FIG. 1 or being attracted by the electromagnet 22 (indicated diagrammatically).

When plate 3 carries the roll of film which is unwinding and plate 4 carries the fill which is being wound on, the direction in which the film is moving through the film-gate is indicated by arrow 27 in FIG. 1. The bar 11 is in the position shown in FIG. 1. Let us suppose that the film is moving forward: a cycle of movements of a claw, not shown, may be broken down into two phases; firstly, the moving forward of the film and secondly, the projection of the image, when the film is stationery. During the forward movement of the film, it is pulled by the claw, which produces a sudden tension in loop 30 of the film. This sudden tension causes the lever 7 to pivot from right to left as shown in FIG. 1. This pivoting brings the pully 18 into contact with the outer wall of the ring-shaped trough 16 in the plate 3 thus causing the plate 3 and the roll of the film to be unwound to turn in a direction which unwinds the film. As soon as the tension is released, i.e. during the projection of an image when the film is stationery in front of the film-gate, the contact between the pully 18 and the wall of the ring-shaped trough 16 is effectively broken and the plate therefore no longer turns and the film stops unwinding.

The pin 12 located at one extremity of lever 7 comes into contact with one of the walls of notch 28 in bar 11, thus preventing pully 18 from touching the inner wall of the ring-shaped trough 16 and bringing about a rotation of plate 3 in the opposite direction, which prevents rewinding the film. In this case spring 14, being only slightly stretched, exerts a very weak force on lever 7. Pin 25 provides a pivot axis that is fixed relative to the camera or projector housing.

When there is no tension on the loop 31, the lever 8 is pulled by a spring 15 fixed to bar 11 causing pully 19 to come into contact with the outer wall of the ring-shaped trough in the plate 4. The plate 4 is thus turned in a direction which winds the film onto the roll. As soon as a tension is exerted on the loop of film 31, i.e. when the film tends to be wound onto the receiving spool faster than it passes through the film-gate, the tension in the loop 31 causes lever 8 to pivot and brings pin 13 up against the walls of notch 29 in bar 11. In this position the pully touches neither the inner nor the outer wall of the trough 17. Therefore, the take-up spool is no longer turned.

When the film is being moved in reverse, the functions of the various parts connected with the two spools are reversed. Thus, electromagnet 23 is activated and causes bar 11 to pivot around its axis 25 into the "reverse" position. This movement stretches spring 14 which then retains pully 18 against the inner wall of trough 16 as long as no tension is exerted on the loop 30 releasing the spring 15.

In the mechanism shown in FIGS. 1 and 2, the speed of the take-up spool turning forwards is not equal to that when it turns backwards because in the first case pully 17 drives the take-up spool by coming into contact with the outer wall of the ring-shaped trough 16 of plate 4, whereas in the second case the pully 17 drives the take-up spool by coming into contact with the inner wall of the trough in the plate 3. In practice this difference of speeds causes no inconvenience.

Figure 3:
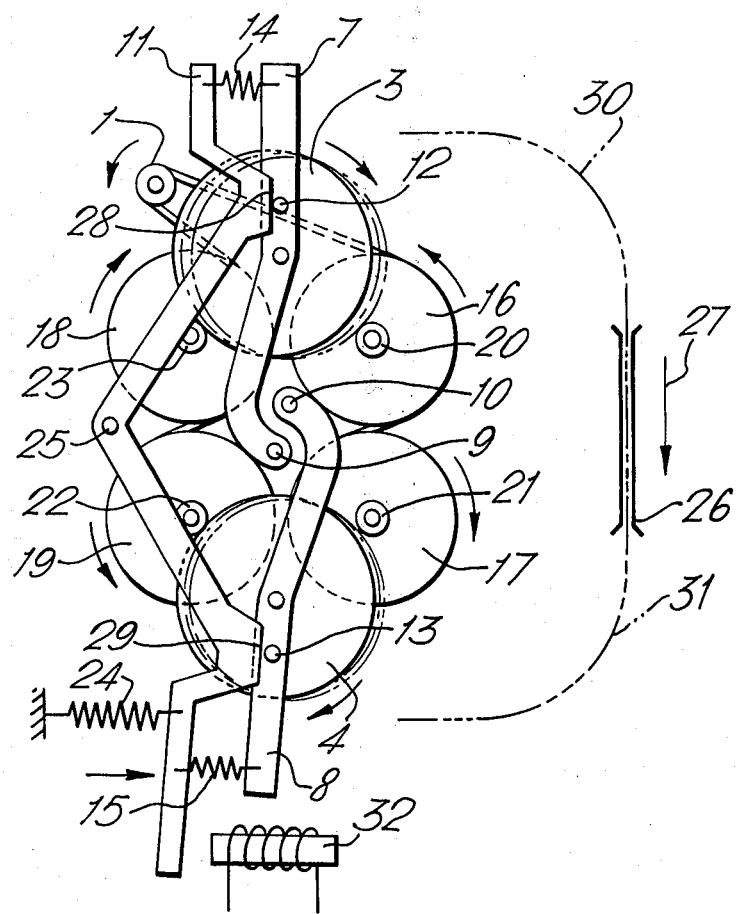
FIG. 3 is a schematic front view of an example of another form of the winding mechanism for film spools according to the invention.

With reference to FIG. 3, the motor shaft 1 is connected by the belt 2 to the oscillating driving mechanism of the film spools, as in FIGS. 1 and 2. This mechanism consists of two plates 3 and 4 which can turn on their axes and are unwound on two elongated levers by means of pivots 9 and 10 respectively. A bar 11 which can turn round the pivot 25 has two stops 28 and 29 which come up against the pins 12 and 13 fixed on the levers 7 and 8. The belt 2 drives four wheels 16, 17, 18 and 19 at a constant speed. These wheels are integral with their respective hubs 20, 21, 22 and 23.

When the film is being unwound from plate 3, i.e. forward, the arm 11 is in the position shown in FIG. 3. As the film moves the sudden tension exerted by the claw on the loop of film 30 causes the lever 7 to pivot from left to right in FIG. 3. This movement of lever 7 brings plate 3 into contact with hub 20 of wheel 16 and thus turns the spool in a direction which unwinds the film. As soon as this tension is released the contact between plate 3 and hub 20 becomes effectively broken, the plate no longer turns and the film is no longer unwound. The pin 12 comes up against the stop 28 thus preventing plate 3 and hub 23 of wheel 18 coming into conatct which would cause the film to be wound back onto the spool.

As in the embodiment shown in FIGS. 1 and 2, plate 4 is in contact with hub 22 as long as no tension is exerted by the loop 31 on the lever 8, lever 8 being retained by the spring 15. The take-up spool on plate 4 turns in a direction which tends to take up the film. When loop 31 shortens, lever 8 pivots, plate 4 is no longer in contact with the hub 22 and the film is no longer wound onto the take-up spool. It may happen that the tension in the loop 31 increases greatly thus causing the angle of movement of the lever 8 to be so wide that the plate 4 comes into contact briefly with hub 21 which causes the take-up spool to turn backward for an instant thus slackening the loop 31.

As in the embodiment shown in FIGS. 1 and 2, the functions of the various parts connected with the spools are reversed when the film is being moved backward.

This oscillating film spool driving mechanism allows a loop of tilm to be situated before and after the film gate so that the claw exerts an almost constant force on the film at each forward movement, thus insuring a high degree of image stability.

The fact that the mechanism is practically symmetrical makes it possible to put it into reverse movement at any time during projection. The electro-magnetic switch allows for easy long-distance control. A further advantage of the invention is that the drive mechanism can be used in cassettes having film spools with a certain amount of radial play and in which the distance traveled by the above described plates and their supports corresponds with said radial play.

Other and further modifications can be made to the present invention without departing from the spirit and scope thereof.

What is claimed is:

1. A film spool drive apparatus for cinematographic equipment comprising first and second film spool support plates, drive means selectively coupled to each of said plates for driving said first plate in a direction to wind the film on its associated spool and to drive the said second plate to unwind the film on its associated spool, and control means operable in response to a predetermined amount of tension in the film loop associated with each of said respective plates for disengaging the drive means from said first plate when its associated film loop tension is above a predetermined amount and for engaging said drive means with said second plate when its associated film loop tension is above a predetermined amount, and wherein said drive means includes first and second wheels, each having a driving surface operatively cooperating with a driving surface of the respective first and second plates, and said control means comprises first and second members coupled to the first and second plates for moving said plates into and out of operable engagement with said respective wheels.

2. The apparatus as set forth in claim 1, wherein said each of said plates has a second driving surface which, when engaged by its respective wheel, causes plate movement in the opposite direction relative to that provided by its other driving surface, a movable control bar means coupled to said drive means for enabling the drive means to engage the other plate surfaces when said control bar means is in a first position and enabling the drive means to engage the second plate surfaces when said control bar means is in a second position, said control means when said control bar means is in the second position being operable for disengaging the drive means from said second plate when its associated film loop tension is above a predetermined amount and for engaging said drive means with said first plate when its associated film loop tension is above a predetermined amount.

3. An apparatus as set forth in claim 2, wherein said other and second driving surfaces comprise spaced concentric surfaces and the associated wheel is movable to engage one or the other of said concentric surfaces or to occupy a nonengaging position between said surfaces.

* * * * *